(12) United States Patent
Kim

(10) Patent No.: US 12,422,026 B2
(45) Date of Patent: Sep. 23, 2025

(54) ENERGY RECOVERY SYSTEM

(71) Applicant: Shin Kim, Hacienda Heights, CA (US)

(72) Inventor: Shin Kim, Hacienda Heights, CA (US)

(*) Notice: Subject to any disclaimer, the term of this patent is extended or adjusted under 35 U.S.C. 154(b) by 0 days.

(21) Appl. No.: 18/736,886

(22) Filed: Jun. 7, 2024

(65) Prior Publication Data

US 2024/0410450 A1 Dec. 12, 2024

Related U.S. Application Data

(60) Provisional application No. 63/507,233, filed on Jun. 9, 2023.

(51) Int. Cl.
| | |
|---|---|
| *F16H 19/00* | (2006.01) |
| *F16H 19/04* | (2006.01) |
| *H02K 7/06* | (2006.01) |
| *H02K 7/116* | (2006.01) |
| *H02K 7/18* | (2006.01) |
| *F03G 7/08* | (2006.01) |

(52) U.S. Cl.
CPC .......... *F16H 19/043* (2013.01); *H02K 7/06* (2013.01); *H02K 7/116* (2013.01); *H02K 7/1853* (2013.01); *F03G 7/081* (2021.08)

(58) Field of Classification Search
CPC ........ F16H 19/043; H02K 7/06; H02K 7/116; H02K 7/1853; F03G 7/081; F05B 2220/60; F05B 2240/941; F05B 2260/42; F05B 2260/503

See application file for complete search history.

(56) References Cited

U.S. PATENT DOCUMENTS

| | | | |
|---|---|---|---|
| 946,671 A | 1/1910 | Hards | |
| 8,618,686 B2* | 12/2013 | Jo | F03B 13/20 |
| | | | 290/53 |
| 10,927,930 B2 | 2/2021 | Zheng | |
| 2012/0074702 A1* | 3/2012 | Ahdoot | F03B 13/182 |
| | | | 290/53 |
| 2012/0313575 A1* | 12/2012 | Stansbury, III | H02J 7/00 |
| | | | 320/137 |
| 2022/0412328 A1* | 12/2022 | Salvaryan | F03G 7/081 |

FOREIGN PATENT DOCUMENTS

| | | |
|---|---|---|
| FR | 2814212 A1 | 3/2002 |
| GB | 191029195 A | 12/1911 |
| WO | WO-2008052212 A2 * | 5/2008 ......... B65G 21/2072 |

OTHER PUBLICATIONS

European Patent Office (ISA); International Search Report and Written Opinion issued in PCT/US2024/032929 mailed Oct. 8, 2024, 15 pages.

* cited by examiner

*Primary Examiner* — Zakaria Elahmadi
(74) *Attorney, Agent, or Firm* — Dinsmore & Shohl LLP

(57) ABSTRACT

The apparatus for capturing energy from a source of linear motion includes a reciprocating gear rail assembly secured to an input shaft that engages an output gear and shaft for driving an electric generator.

17 Claims, 9 Drawing Sheets

ENERGY RECOVERY SYSTEM

BACKGROUND OF THE INVENTION

Field of the Invention

The present invention relates generally to a system and apparatus for recovering unused mechanical energy and more specifically to a system and apparatus for capturing energy from linear or near-linear mechanical motion and converting it to rotational motion to drive a generator or other electrical power source.

Description of the Related Art

In modern electromechanical systems there is an emphasis on efficient use of energy. Particularly in automotive or transportation oriented machinery, the efficient use of the source of locomotive energy—be it internal combustion, electric, or hybrid—in operating the vehicle or mode of transport is a critical factor in end-user purchasing decisions. Highly energy efficient vehicles are frequently purchased by consumers concerned with environmental impacts and operating costs of their transportation. Thus the need for energy efficient machines is a constant and foremost design and manufacturing goal, particularly as it pertains to transportation systems.

In many complex systems used for transportation, or a wide variety of manufacturing and other applications, a large portion of energy that is used to drive the system is wasted. For example, when a car, truck, or other vehicle that is being driven bounces up and down, or yaws side-to-side, the compression and rebound of the suspension system represents an energy source (linear motion) that is partially wasted. Similarly, the braking of a vehicle provides energy that can be captured and reused.

To cite one example of a prior art system that addresses these deficiencies, regenerative braking systems have been implemented on many electric vehicles (EV's) and hybrid vehicles, whereby the wheels of the vehicle are coupled to an electrical generator only when the vehicle is under braking, and the generator output is used to charge a vehicle battery or batteries. Unfortunately, much of the motion imparted to a vehicle by bumps and terrain variations is wasted as the vehicle moves, such that recovery of even a small portion of the "wasted" motion energy of a vehicle could be highly desirable.

Based on the foregoing, there is a need in the art for a system and apparatus that captures at least a portion of the energy caused by extraneous motion in any system with moving components.

SUMMARY OF THE INVENTION

The embodiments described in this specification overcome the aforementioned difficulties and deficiencies in the prior art by providing an improved system for capturing energy and transmitting linear motion into rotational motion.

In one embodiment and aspect the system includes a movable gear rail assembly that is secured to an input shaft or equivalent external source of linear or reciprocating motion. The gear rail assembly reciprocates inside an external enclosure through which the input shaft extends.

An output gear is positioned in a fixed location between opposed gear rails. The gear rails are capable of reciprocating and lateral motion so that the output gear is selectively engaged by one gear rail in one direction of linear motion, and thence engaged by the other gear rail in the opposite direction of linear motion.

In some aspects and embodiments the gear rail assembly includes a pair of spaced, opposed gear rails having a plurality of teeth thereon. The gear rails are mounted such that they are capable of a predetermined amount of lateral motion with respect to each other. In some embodiments the gear rails are resiliently mounted to a frame assembly that provides a spring bias to the gear rails to enable lateral movement under force.

Furthermore, in some aspects and embodiments the output gear is secured to an output shaft that may be coupled to an external power generation device, for example an electric generator or the like. The output gear rotates in a single direction, engaging first one opposed gear rail, then the opposite gear rail, as the gear rail assembly reciprocates as the input shaft moves upwardly and downwardly, for example. The generator may produce electrical power that is operatively coupled to a battery or other energy storage system.

Other features, objects and advantages of the embodiments described herein will become apparent from the detailed description of the invention taken in conjunction with the appended drawing Figures.

BRIEF DESCRIPTION OF THE DRAWING FIGURES

DETAILED DESCRIPTION OF THE PREFERRED EMBODIMENT(S)

Figure 1:
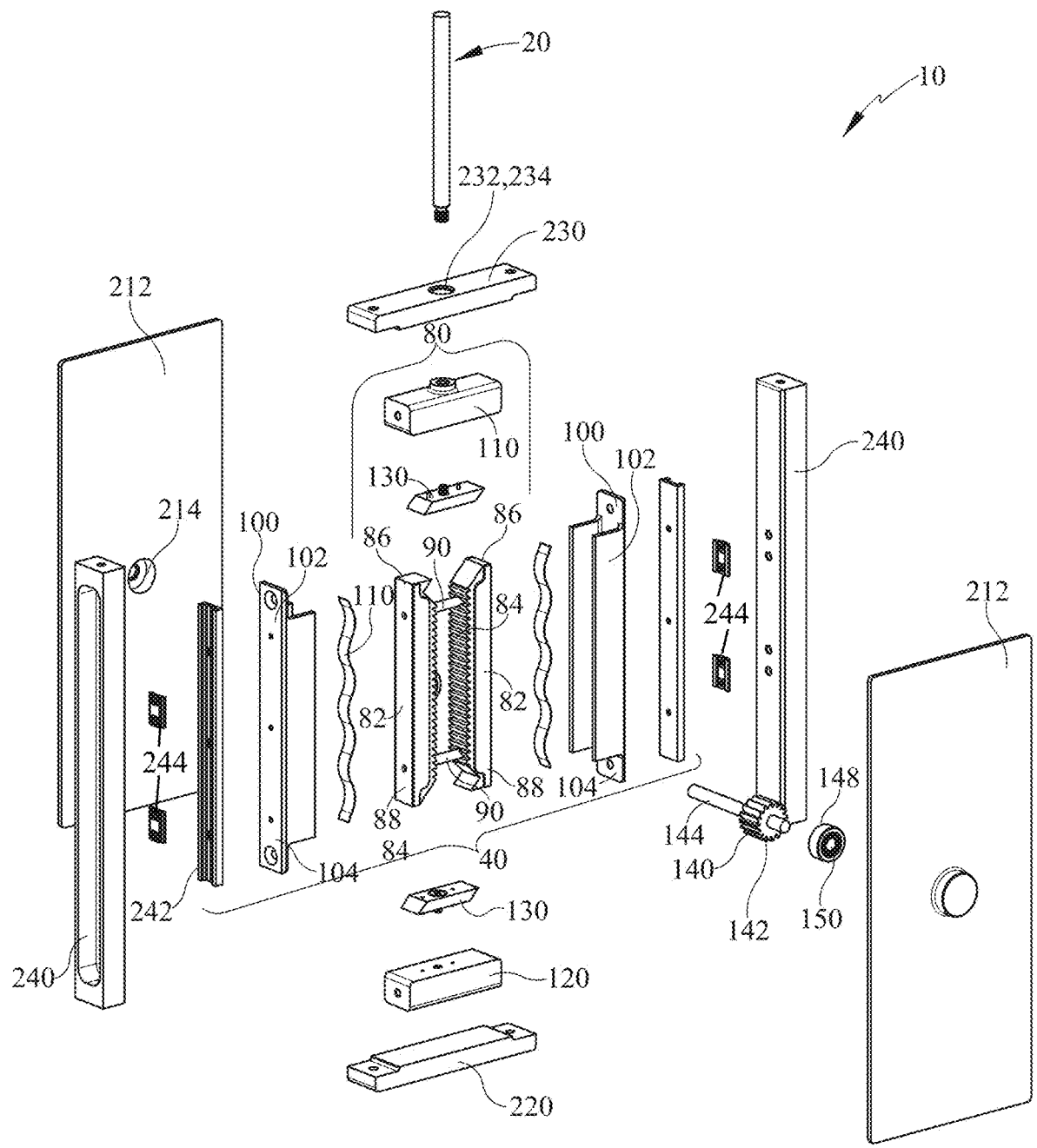
FIG. 1 is an exploded perspective view of an apparatus in accordance with some aspects and embodiments.
Figure 2:
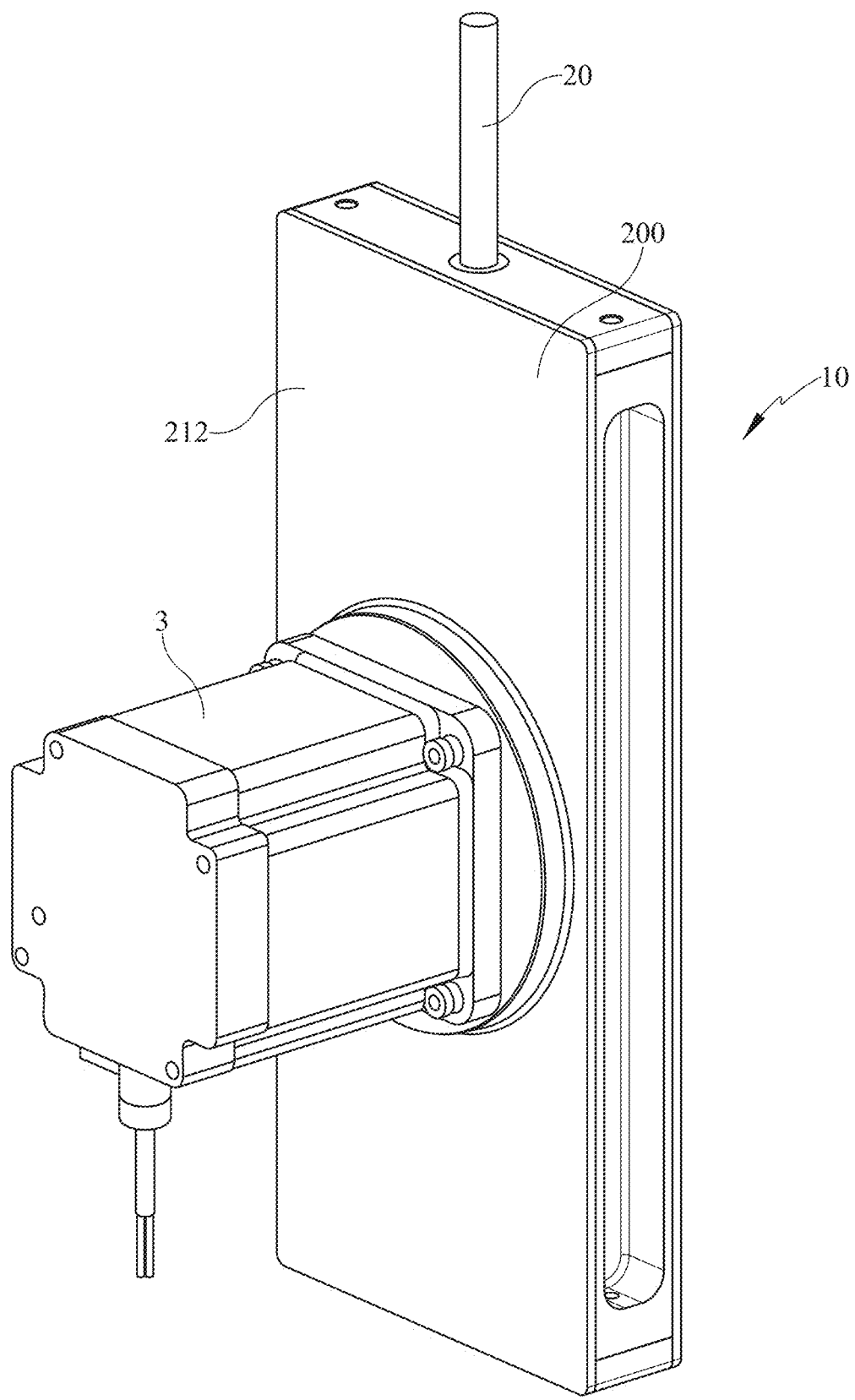
FIG. 2 is a perspective view of an apparatus coupled to a generator in accordance with some aspects and embodiments.

Referring now to FIGS. 1-9 and in accordance with some embodiments and aspects of the system described herein, an apparatus 10 for translating linear motion into one-way rotational motion includes generally an input shaft 20 for providing a source of linear motion, an inner enclosure 40 that houses a gear rail assembly 80. Apparatus 10 further includes an output gear 140 that engages gear rail assembly 80 and provides rotational motion and power. It should be noted that the embodiments disclosed herein, while described in detail, are capable of being constructed in a variety of equivalent embodiments that are encompassed within the general structures and inventive concepts set forth below.

Figure 4:
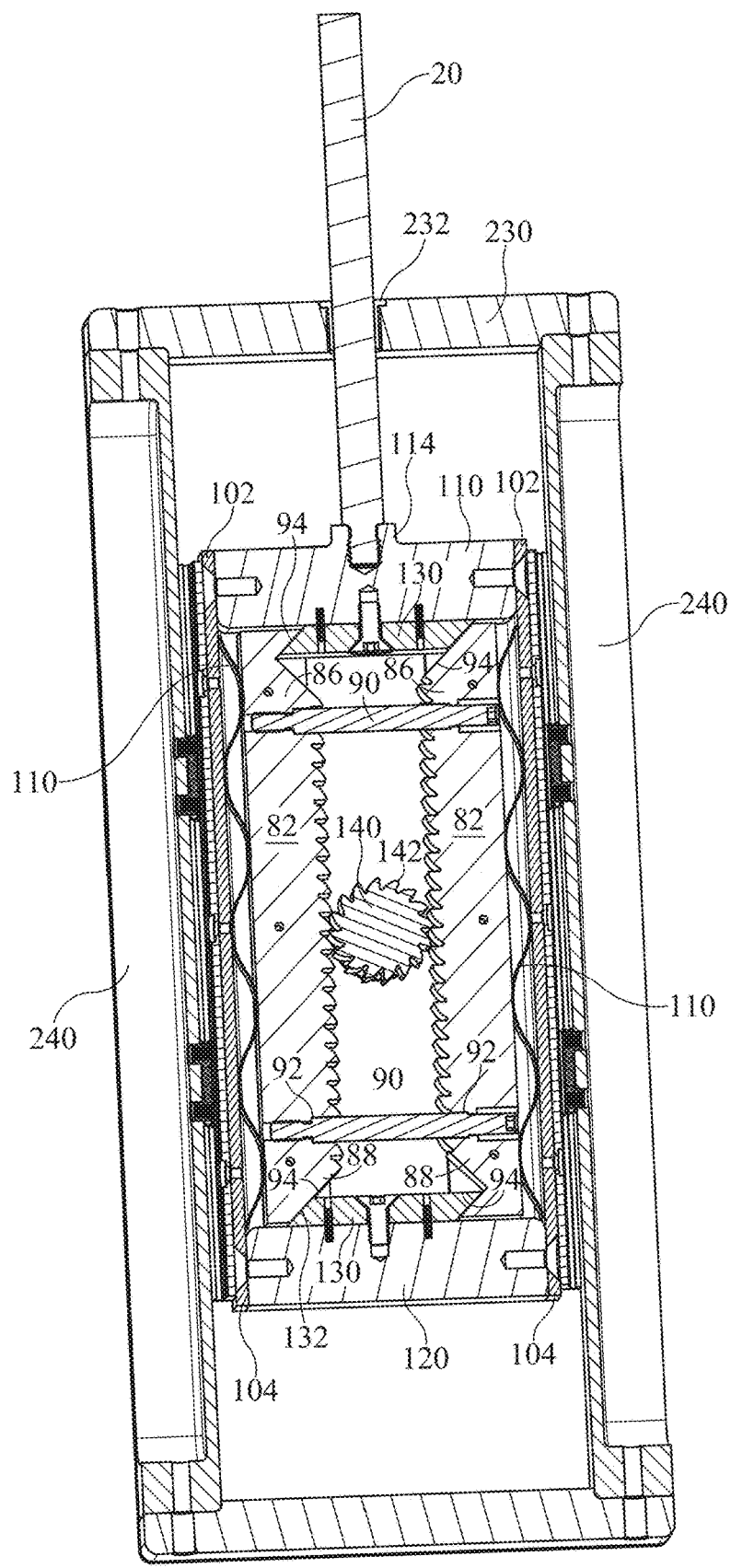
FIG. 4 is a perspective cross-sectional view of an apparatus in accordance with some aspects and embodiments.
Figure 5:
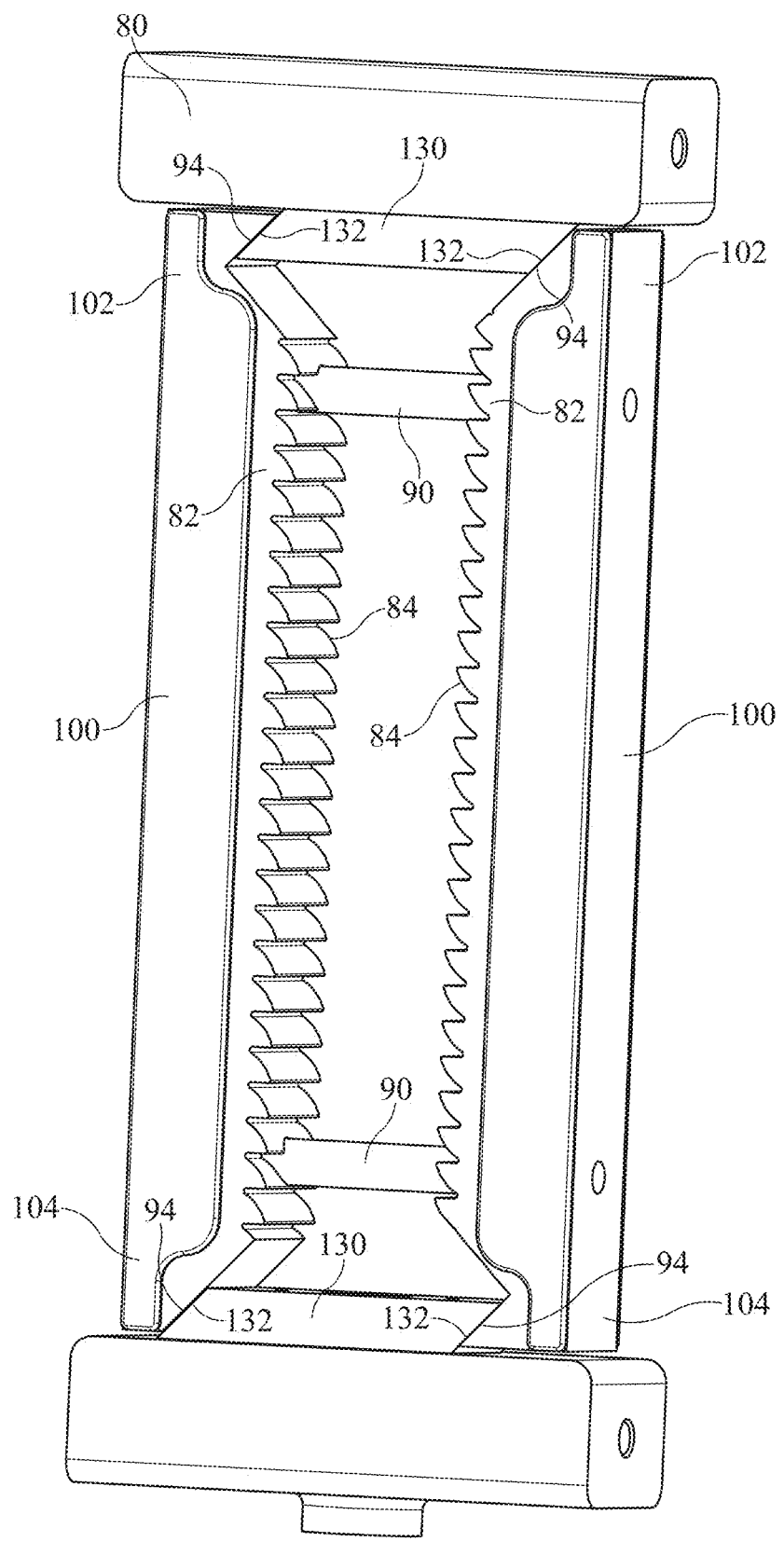
FIG. 5 is a perspective view of a gear rail assembly in accordance with some aspects and embodiments.
Figure 6:
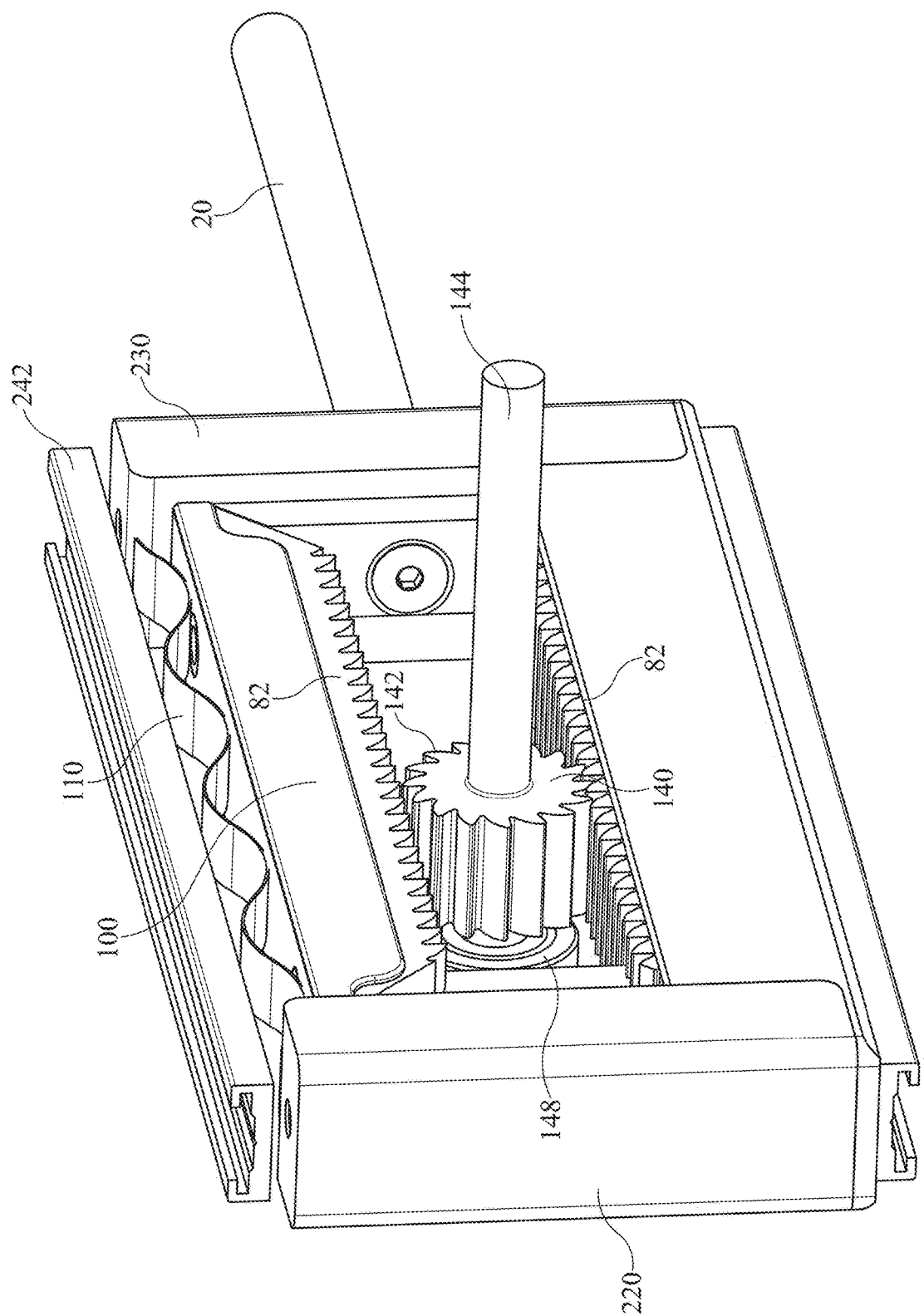
FIG. 6 is a perspective view of a gear rail assembly and output shaft in accordance with some aspects and embodiments.
Figure 7:
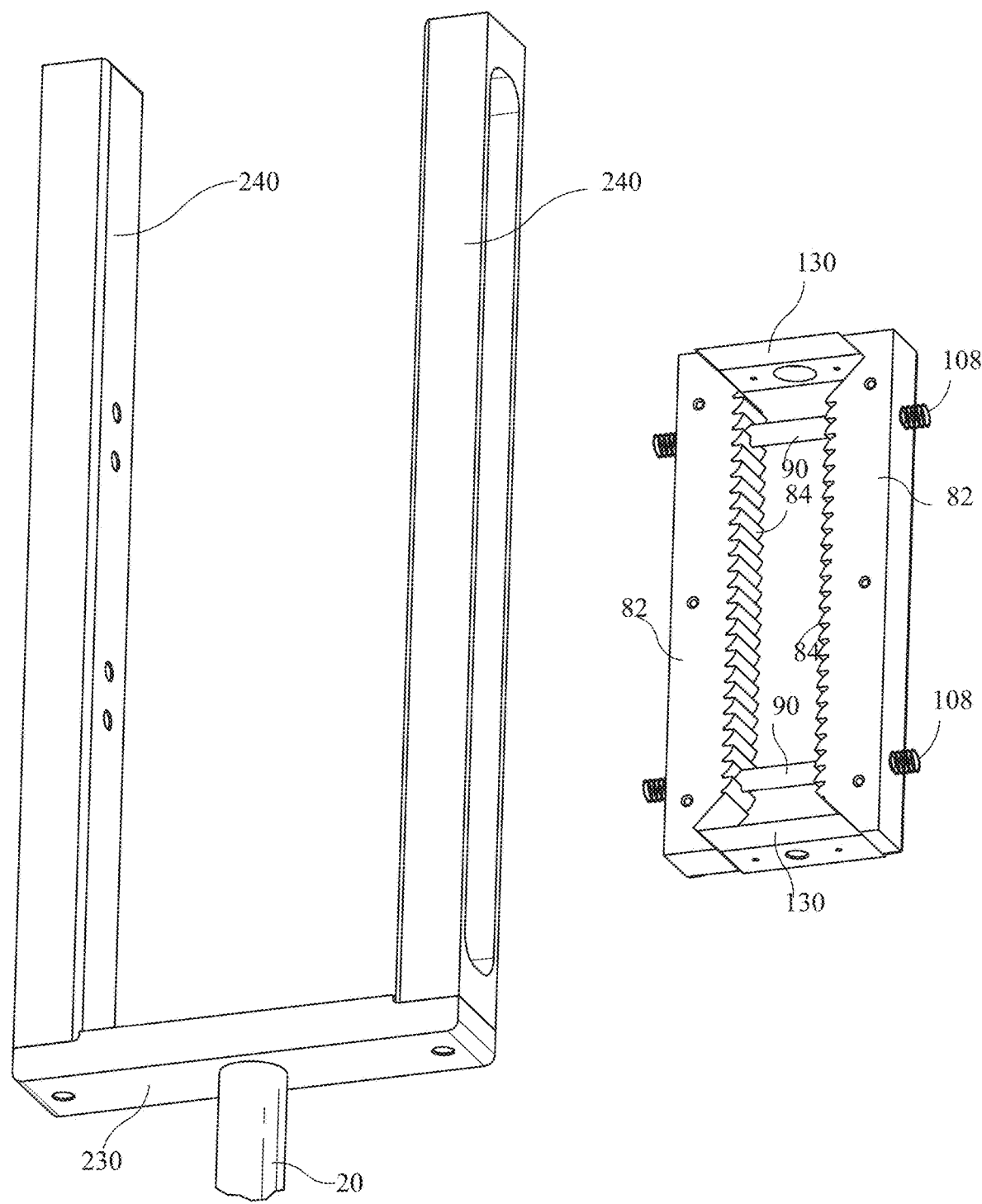
FIG. 7 is a disassembled view of a gear rail and alternate spring assembly in accordance with some aspects and embodiments.
Figure 8:
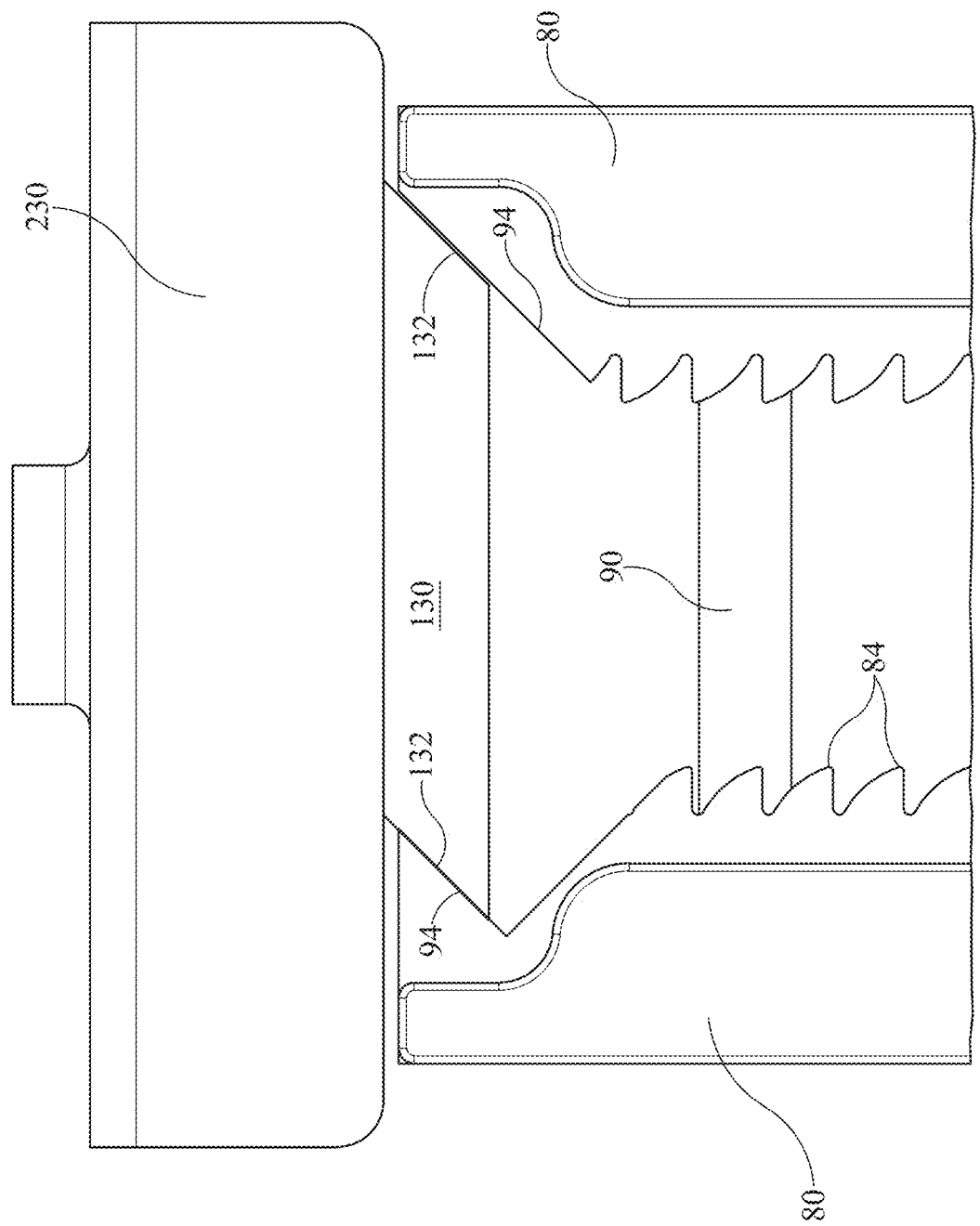
FIG. 8 is a view of the angled surfaces of the gear rail and guide block in accordance with some aspects and embodiments.
Figure 9:
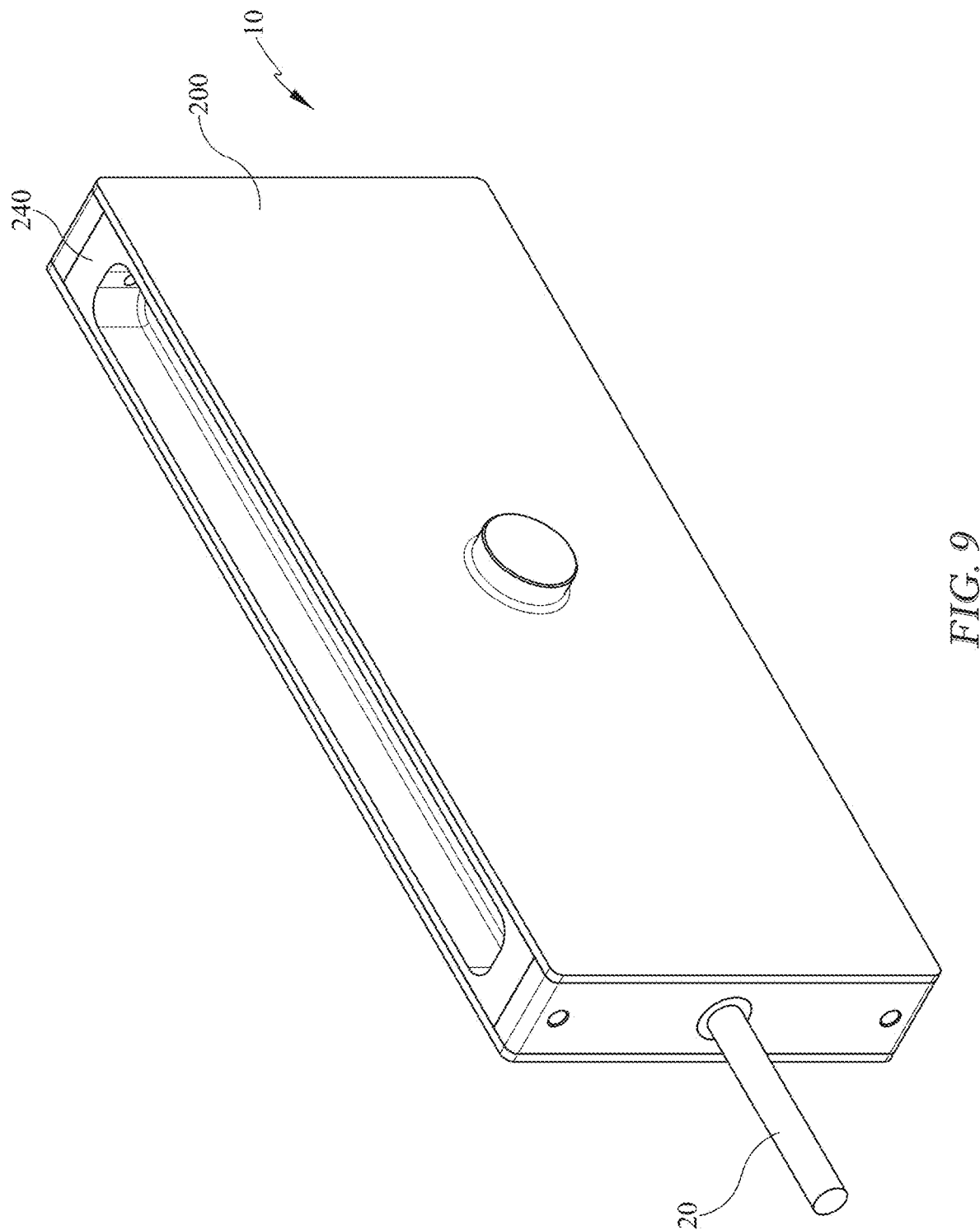
FIG. 9 is a perspective view of the apparatus in accordance with some aspects and embodiments.

As best depicted in FIGS. 1, 4 and 5, gear assembly rail assembly 80 includes a pair of opposed, left and right, generally linear gear rails 82 having opposed gear teeth 84 facing inwardly, toward each other. The gear rails 82 are spaced apart at top and bottom ends 86 and 88 respectively by two or more slider shafts 90 each having a shoulder stops 92 on each such that the gear rails 82 will move laterally apart from each other slightly, but not move toward each other past a predetermined distance as determined by the position of shoulder stops 92. A pair of left and right rail frames 100 are disposed outwardly of gear rails 82. Rail frames 100 are shaped to engage and capture left and right gear rails 82 respectively. The left and right rail frames 100 each have top 102 and bottom 104 ends. Furthermore, a spring or springs 108 are disposed between the rail frames and gear rails to provide a flexible bias between the rail frames 100 and gear rails 82. In some embodiments springs 108 can be wave springs, leaf springs, or coil springs 108 as depicted in FIG. 7, for example, as required by a given application without departing from the scope of the disclosed embodiments.

Figure 3:
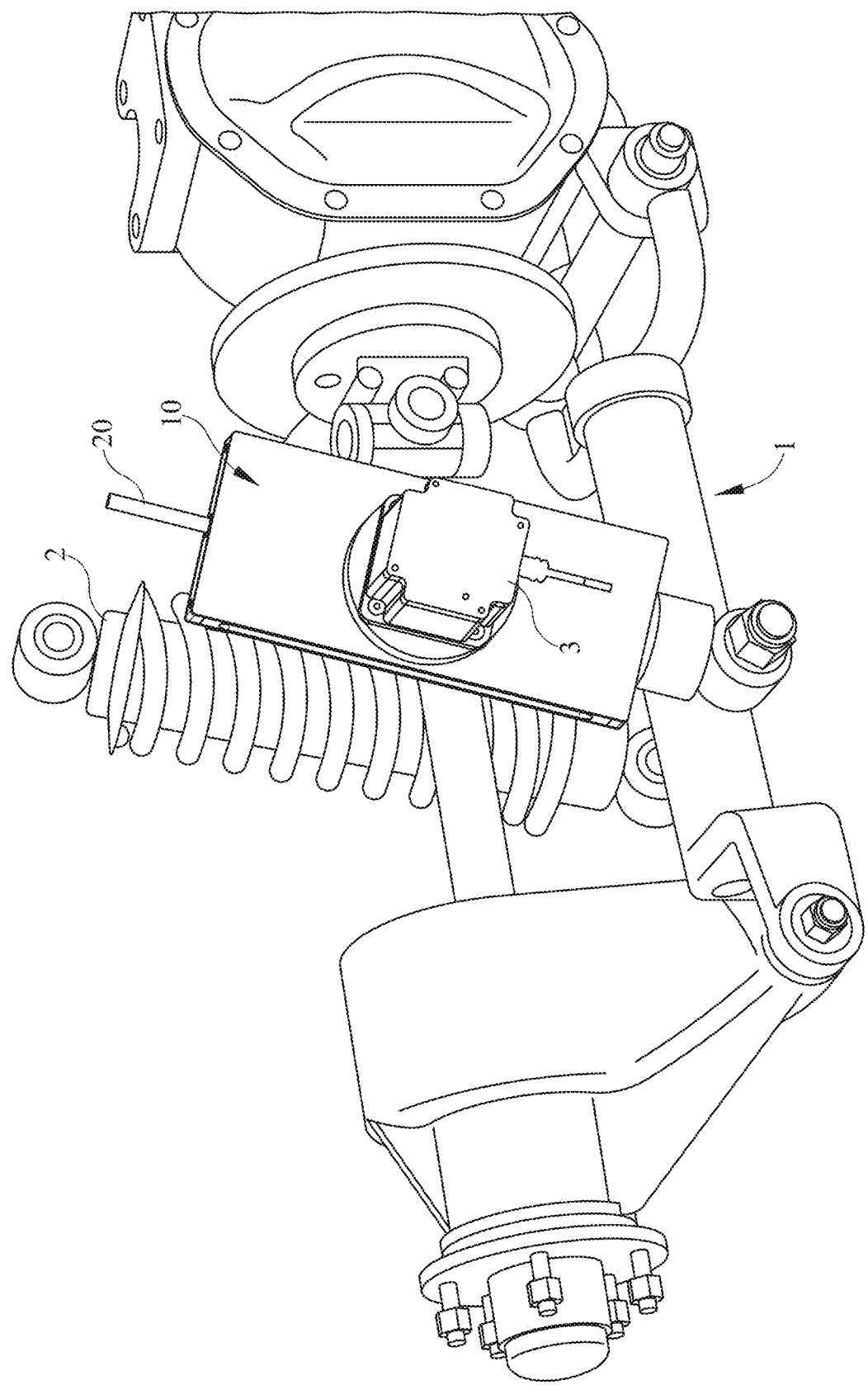
FIG. 3 is a perspective view of an apparatus mounted for operation on a vehicle in accordance with some aspects and embodiments.

The gear rail assembly 80 may further comprise an upper block 110 that is secured to the top ends 102 of the respective left and right rail frames 100, for example with a conventional fastener. The upper block 110 is secured (or slidably attached) to an input shaft 20 or rod at a point on the top or upper side of upper block 110, proximate the middle or center 114 thereof whereby input shaft 20 imparts linear motion to upper block and therefore gear rail assembly 80, as will be described further herein below. In some aspects and embodiments input shaft 20 can be secured or attached to an external source of linear motion, for example a strut 2 of an automotive suspension assembly 1 as depicted in FIG. 3.

Similarly, a lower block 120 is secured (or slidably attached) to the bottom 104 ends of the respective left and right rail frames 100. In this fashion the entire gear rail assembly 80, left and right frames 100, left and right gear rails 82, upper block 110 and lower block 120 all move upwardly and downwardly according to the linear motion imparted by input shaft 20.

In some aspects and embodiments top and bottom ends 86, 88 of each left and right gear rail 82 include an angled surface 94 thereon, as best viewed in FIGS. 1, 4 and 5 for example. Additionally, a guide block 130 having parallel angled surfaces 132 is secured to both upper 110 and lower 120 blocks. In some embodiments guide block 130 may be manufactured as an integral part of component of top block 110 and lower block 120. Guide blocks 130 angled surfaces 132 engage gear rail 82 angled surfaces 94 and thereby slide or move relative to each other are gear rails 82 move upwardly and downwardly. In these embodiments gear rails 82 are free to move along the angled surfaces of the upper 110 and lower 120 blocks as upper block 110 is "pushed" and "pulled" by the linear motion of input shaft 20. This feature of the invention imparts a slight lateral motion to gear rails 82 (pushing against springs 108) from left to right as the entire gear rail assembly 80 moves up and down by the motion imparted by input shaft 20.

A generally annular output gear 140 having a plurality of teeth 142 disposed around the circumference thereof is provided, positioned between left and right gear rails 82. The output gear may further include an output shaft 144 journaled for rotation with output gear 140, for driving an external power generator 3, as seen for example in FIG. 2. Output gear 140 teeth 142 may, in some embodiments, have curved or rounded trailing edges such that output gear 140 only engages the left gear rail 82 in one linear direction, and the right gear rail 82 in the alternate linear direction. Furthermore, the slight lateral motion of gear rails 82 provided by the relative motion of angled surfaces 94, 132 as input shaft 20 reciprocates forces gear rails 82 to selectively engage output gear 140 as they move upwardly and downwardly. For example, as gear rail assembly 80 is forced downwardly, the entire gear rail assembly 80 moves leftwardly (in the drawing Figures), thereby allowing output gear 140 to engage the right gear rail 82. As gear rail assembly 80 reverses direction and moves upwardly, it moves rightwardly, thereby allowing output gear 140 to engage left gear rail 82. In both cases output gear 140 rotates in the same direction, thus enabling output gear 140 and output shaft 146 to be coupled directly to an external power generator 3, for example a DC generator used to supply power to a battery or charging system in automotive applications. As can be seen from the above description, this system 10 is capable of capturing wasted linear motion and translating it into usable rotational motion to drive a generator 3 or any other machine requiring a rotational motion input.

In further aspects and embodiments of the invention, an external enclosure 200 is comprised of a four sided frame 210 with components for engaging frame rails 100 of gear assembly 80. A pair of opposed sides 212 are provided, one of which includes an aperture 214 through which output shaft 144 can extend and be journaled for rotation. The external enclosure 200 also includes a bottom end 220 enclosing lower block 120 and a top end 230 enclosing upper block 110. Top end 230 also includes an aperture 232 with a concomitant bushing 234 through which input shaft 20 is disposed. The input shaft 20 is capable of moving freely in a linear direction to move gear rail assembly 80 as described herein above. The external enclosure 200 also includes two opposed enclosure sides 240 that are mounted by a set of bearings 244 to a pair of opposed enclosure rails 242 that engage frame rails 100 of gear rail assembly 80. Enclosure rails 242 and frame rails 100 are free to move relative to enclosure sides 240 such that gear rail assembly 80 is also free to move in a linear fashion, upwardly and downwardly for example. As such, external enclosure 200 is sized to accommodate any required length of linear motion or stroke, as the gear rail assembly moves upwardly and downwardly therein.

In some aspects and embodiments external enclosure 200 may include one side 212 that is completely sealed except for a radial bushing 148 having an aperture 150 therein that operates to support output shaft 144 on one side thereof.

In operation, and as described herein above, input shaft 10 will provide linear motion imparted by an external source, for example a strut 2 of an suspension that is then transferred to gear rail assembly 80, thence to output gear 140 in the form of rotational motion, and then into the output shaft 144. The external enclosure 200 may be secured or mounted to a nearby source of linear motion, for example an automotive strut 2 or the like, which in turn fixes the position of output gear shaft 144 relative to the mounting structure (strut 2) but still allows rotational movement. The input shaft 20 moves in a linear direction, passing through 234 support bushing in top end 230 of external enclosure 200. The input shaft 20 is secured to upper block 110 to drive gear rail assembly 80. The gear rail assembly 80 is movably enclosed by external enclosure 200 by enclosure sides 240 and enclosure rails 242 that allows gear rail assembly 80 to move in a linear motion in concert with input shaft 20. Gear rail is assembly 80 is thus restrained, but floating inside external enclosure 200.

Furthermore, gear rail assembly 80 is restrained on each side by springs 108 that will force the engagement of gear rails 82 and output gear 140 but has the capability to allow each gear rail 82 to selectively disengage from output gear 140 in one direction using the gear tooth 142 profile, slider shafts 90 and the spring tension provided by frame rails 100 and springs 108. Accordingly, if an unforeseen misalignment or failure should occur, gear rail assembly 80 can essentially reset itself with no outside maintenance required.

Furthermore, angled surfaces 94 of left and right gear rails 82 and angled surfaces 132 of top and bottom guide blocks 130 allow the linear motion from input shaft 20 to impart a slight lateral and/or elliptical motion to gear rail assembly 80. As input shaft 20 is actuated in one direction it forces gear rail assembly 80 to move laterally to one side. When it does so, that side of gear rail 82 engages output gear 140 in one direction and gear rail assembly 80 is no longer floating and transfers load directly from input shaft 20 into output gear 140. Once input shaft 20 reciprocates in the other direction guide blocks 130 force gear rail assembly 80 to move laterally to the other side and engage output gear 140 in the exact same way but on the other side of the gear 140. Typically this would cause binding and "lock" the gear 140 up, but since gear teeth 142 on gear rail assembly 80 are facing in opposite directions it creates a circular drive motion around the fixed output gear 140 and allows linear motion to be translated into unidirectional rotational motion.

While a variety of inventive embodiments have been described and illustrated herein, those of ordinary skill in the art will understand that a variety of other methods, systems, and/or structures for performing the function and/or obtaining the results, and/or one or more of the advantages described herein are possible, and further understand that each of such variations and/or modifications is within the scope of the inventive embodiments described herein. Those skilled in the art will understand that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2 (b) of the Patent Cooperation Treaty ("PCT") do not limit the scope While the apparatus and system for capturing energy by translating linear motion to rotational motion shown and described herein in what are considered to be the preferred embodiments thereof, illustrating the results and advantages over the prior art obtained through various embodiments, the apparatus and system is not limited to those specific embodiments. Thus, the forms of the system and apparatus shown and described herein are to be taken as illustrative only and other embodiments may be selected without departing from the scope of the claims appended hereto.

I claim:

1. An apparatus for translating reciprocating linear motion provided by an input shaft into rotational motion comprising:
   a gear assembly comprising:
      a pair of opposed left and right gear rails spaced a variable distance apart, each of said gear rails having a plurality of inward facing gear teeth and top and bottom ends respectively;
      a pair of opposed left and right rail frames for engaging said left and right gear rails, each of said left and right rail frames having top and bottom ends and each of said left and right rail frames having a spring disposed between said rail frame and said gear rail;
      an upper block secured to said opposed left and right rail frame top ends and to said input shaft;
      a lower block secured to said left and right rail frame bottom ends; and
      an annular drive gear having a plurality of teeth around the circumference thereof, said drive gear disposed between said left and right gear rails and selectively engaging the teeth thereof, whereby linear motion of said input shaft imparts linear motion to said gear rails thereby rotating said drive gear.

2. The apparatus of claim 1 comprising:
   a pair of angled surfaces at the top and bottom ends of each gear rail;
   an upper rail guide block having a pair of opposed angled surfaces on first and second ends thereof, said upper rail guide block disposed between said upper block and said left and right gear rail top ends;
   a lower rail guide block having a pair of opposed angled surfaces on first and second ends thereof, said lower rail guide block disposed between said lower block and said left and right gear rail bottom ends; and
   wherein the angled surfaces of said upper rail guide block engage the angled surfaces at the top ends of said gear rails and the angled surfaces of said lower rail guide block engage the angled surfaces at the bottom ends of said gear rails, whereby linear motion imparted by said input shaft imparts lateral motion to said left and right guide rails, thereby providing for selective engagement of said drive gear.

3. The apparatus of claim 1 wherein said annular drive gear teeth have curved trailing edges such that said drive gear only engages one of said right and left gear rails at a time.

4. The apparatus of claim 1 wherein said left and right gear rails are spaced by a pair of slider shafts disposed between said left and right gear rails such that said annular drive gear engages said left gear rail when said gear assembly moves in a first linear direction, and engages said right gear rail when said gear assembly moves in a second linear direction, opposite said first linear direction.

5. The apparatus of claim 2 wherein said left and right gear rails move laterally such that said annular drive gear engages said left gear rail when said gear assembly moves in a first linear direction, and engages said right gear rail when said gear assembly moves in a second linear direction, opposite said first linear direction.

6. The apparatus of claim 1 wherein said springs disposed between said rail frames and said gear rails are wave springs.

7. The apparatus of claim 1 wherein said springs disposed between said rail frames and said gear rails are coil springs.

8. The apparatus of claim 1 comprising:
   an external enclosure having a top end including an aperture through which said input shaft is disposed, a bottom end, and first and second opposed sides, and wherein said first side includes an aperture through which an output shaft extends, said output shaft journaled for rotation with said annular gear.

9. The apparatus of claim 8 wherein said gear assembly moves linearly and laterally within said external enclosure to impart rotation in a single direction to said annular gear and thus said output shaft.

10. The apparatus of claim 9 wherein said output shaft is coupled to an electric generator.

11. The apparatus of claim 9 wherein said input shaft is secured to an external source of linear motion.

12. An apparatus for translating reciprocating linear motion provided by an input shaft into rotational motion comprising:
   a gear assembly comprising:
      a pair of variably spaced gear rails each having a plurality of inwardly facing gear teeth and top and bottom ends respectively;
      a pair of opposed rail frames each having top and bottom ends, and having a plurality of springs secured thereto, said springs engaging said gear rails;
      an upper block secured to said opposed rail frame top ends and to said input shaft;
      a lower block secured to said opposed rail frame bottom ends; and
      an annular drive gear having a plurality of teeth around the circumference thereof, said drive gear disposed between said opposed gear rails and selectively engaging the teeth thereof.

13. The apparatus of claim 12 comprising:
   a pair of angled surfaces at the top and bottom ends of each gear rail;
   an upper rail guide block disposed between said upper block and said opposed gear rail top ends having a pair of opposed angled surfaces on first and second ends thereof for engaging the angled surfaces of said gear rail top ends; and
   a lower rail guide block disposed between said lower block and said opposed gear rail bottom ends having a pair of opposed angled surfaces on first and second ends thereof for engaging the angled surfaces of said gear rail bottom ends.

14. The apparatus of claim 12 wherein said annular drive gear teeth have curved trailing edges such that said drive gear only engages one of said opposed gear rails at a time.

15. The apparatus of claim 12 wherein said opposed gear rails are spaced by a pair of slider shafts disposed there between.

16. The apparatus of claim 13 wherein said left and right gear rails move laterally such that said annular drive gear engages said left gear rail when said gear assembly moves in a first linear direction, and engages said right gear rail when said gear assembly moves in a second linear direction, opposite said first linear direction.

17. The apparatus of claim 12 comprising:
an output shaft secured to said annular gear.

* * * * *